(12) United States Patent
Kemmler

(10) Patent No.: US 9,934,482 B2
(45) Date of Patent: Apr. 3, 2018

(54) CONTENT MAINTENANCE OPTIMIZATION

(71) Applicant: Andreas Kemmler, Boennigheim (DE)

(72) Inventor: Andreas Kemmler, Boennigheim (DE)

(73) Assignee: SAP SE, Walldorf (DE)

( * ) Notice: Subject to any disclaimer, the term of this patent is extended or adjusted under 35 U.S.C. 154(b) by 1089 days.

(21) Appl. No.: 13/902,659

(22) Filed: May 24, 2013

(65) Prior Publication Data

US 2014/0351162 A1   Nov. 27, 2014

(51) Int. Cl.
*G06F 9/445*   (2006.01)
*G06Q 10/08*   (2012.01)
*H04L 12/771*  (2013.01)
*H04L 12/24*   (2006.01)

(52) U.S. Cl.
CPC ............ *G06Q 10/083* (2013.01); *G06F 8/61* (2013.01); *G06F 8/60* (2013.01); *G06F 8/65* (2013.01); *H04L 41/082* (2013.01); *H04L 45/563* (2013.01)

(58) Field of Classification Search
CPC ..... G06F 8/65; G06F 8/61; G06F 8/60; G06F 8/71; G06F 17/218; H04L 41/082; H04L 45/563
See application file for complete search history.

(56) References Cited

U.S. PATENT DOCUMENTS

| | | | |
|---|---|---|---|
| 6,112,181 A | 8/2000 | Shear et al. | |
| 8,255,557 B2 | 8/2012 | Raciborski et al. | |
| 8,265,942 B2 | 9/2012 | Doyle et al. | |
| 2001/0051980 A1 | 12/2001 | Raciborski et al. | |
| 2005/0022007 A1 | 1/2005 | Phillips et al. | |
| 2005/0027715 A1 | 2/2005 | Casey et al. | |
| 2007/0156726 A1 | 7/2007 | Levy | |

(Continued)

FOREIGN PATENT DOCUMENTS

EP   1630700 A1   3/2006

OTHER PUBLICATIONS

Gerco Ballintijn, A Case Study of the Release Management of a Health-care Information System, ICSM, 2005, retrieved online on Oct. 22, 2015, pp. 1-10. Retrieved from the Internet: <URL: http://citeseerx.ist.psu.edu/viewdoc/download?doi=10.1.1.467.260&rep=rep1&type=pdf>.*

(Continued)

*Primary Examiner* — Hanh T Bui
(74) *Attorney, Agent, or Firm* — Schwegman Lundberg & Woessner, P.A.

(57) ABSTRACT

In an example embodiment, a delivery unit comprises a plurality of objects. The delivery unit is encapsulated within a transport container for delivery to an entity for installation. As new versions of the objects are created by modifying the source code, the modified versions of objects are included in the delivery unit along with unmodified versions of the remaining objects of the delivery unit. The modified versions of the objects are marked for installation, while the unmodified versions are not marked for installation. Upon installation, the objects marked for installation are extracted from the delivery unit while the objects not marked for installation are discarded. The extracted objects are then installed, thus updating any previous versions of the objects, while unmodified objects are not installed. In one representative embodiment, objects are procedures of a database system, which may be organized hierarchically into folders.

20 Claims, 8 Drawing Sheets

(56) References Cited

U.S. PATENT DOCUMENTS

| | | | | |
|---|---|---|---|---|
| 2007/0234349 | A1* | 10/2007 | Ushiku | G06F 8/61 717/174 |
| 2007/0245342 | A1* | 10/2007 | Lee | G06F 8/63 717/174 |
| 2009/0083509 | A1* | 3/2009 | Johnson | G06F 12/0253 711/170 |
| 2010/0023934 | A1* | 1/2010 | Sheehan | G06F 9/44536 717/168 |
| 2010/0077056 | A1 | 3/2010 | Kokal et al. | |
| 2010/0306079 | A1 | 12/2010 | Zmolek | |
| 2011/0107324 | A1* | 5/2011 | Kumar | G06F 8/63 717/174 |
| 2011/0320502 | A1 | 12/2011 | Marin | |
| 2012/0246120 | A1* | 9/2012 | Brooks | G06F 8/68 707/687 |
| 2013/0073808 | A1 | 3/2013 | Puthalath et al. | |

OTHER PUBLICATIONS

Robin Garner et al., Effective Prefetch for Mark-Sweep Garbage Collection, ACM, 2007, retrieved online Dec. 14, 2017, pp. 43-54. Retrived from the Internet: <URL: http://delivery.acm.org/10.1145/1300000/1296915/p43-garner.pdf?>.*

Boughanem, M., et al., "Query modification based on relevance back-propagation in an ad hoc environment", Information Processing & Management, 35(2), (Mar. 1999), 121-139.

Cooper, J. W, et al., "Lexical Navigation: Visually Prompted Query Expansion and Refinement", Proceedings of the Second ACM International Conference on Digital Libraries, (Jul. 23, 1997), 237-246.

Doulamis, N., et al., "A neural network approach to interactive content-based retrieval of video databases", 1999 International Conference on Image Processing, 1999. ICIP 99. Proceedings. (vol. 2 ), (1999), 116-120.

Maheshwari, Umesh, et al., "Partitioned Garbage Collection of a Large Object Store", Technical Report MIT/LCS/TR-699. MIT Laboratory for Computer Science, (Oct. 1996), 14 pgs.

Wiesener, S., et al., "SemaLink: an approach for semantic browsing through large distributed document spaces", Proceedings of the Third Forum on Research and Technology Advances in Digital Libraries, 1996. ADL '96., (1996), 86-94.

* cited by examiner

CONTENT MAINTENANCE OPTIMIZATION

TECHNICAL FIELD

This disclosure relates to updating objects used in a system. More particularly, this disclosure relates to a set of objects organized into a delivery unit, which is then transported to an installation location. Upon arrival at the installation location, only modified objects in the delivery unit are installed.

BACKGROUND

Updates to objects are typically packaged together into an installation unit and the installation unit transported to an installation site. Upon arrival at the installation site, the contents of the installation unit are extracted and installed either in their entirety or based upon selection of a user at the installation site.

DETAILED DESCRIPTION

The description that follows includes illustrative systems, methods, techniques, instruction sequences, and computing machine program products of illustrative embodiments. In the following description, for purposes of explanation, numerous specific details are set forth in order to provide an understanding of various embodiments of the inventive subject matter. It will be evident, however, to those skilled in the art that embodiments of the inventive subject matter may be practiced without these specific details. In general, well-known instruction instances, protocols, structures, and techniques have not been shown in detail.

Figure 1:
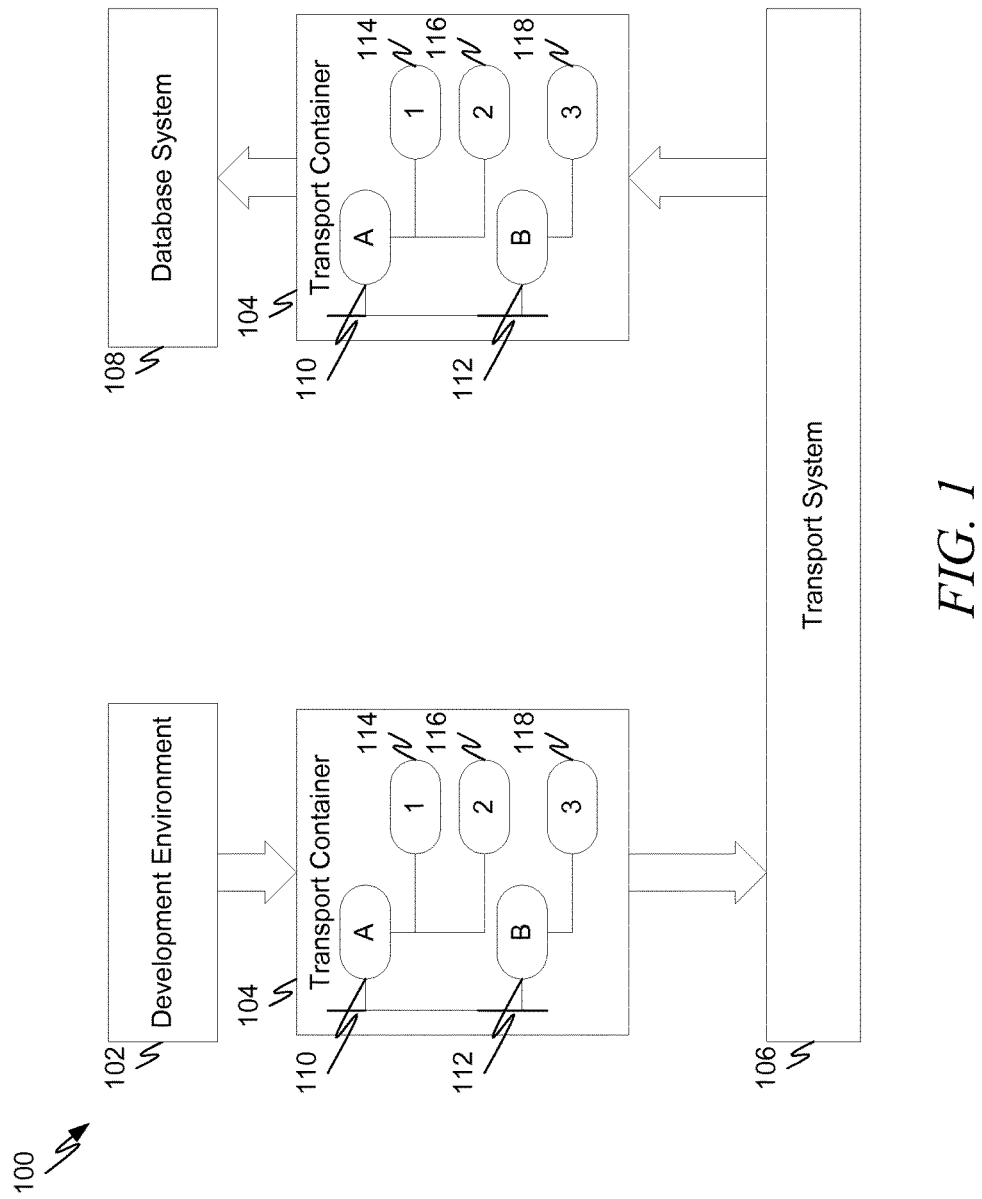
FIG. 1 is a diagram illustrating an example embodiment for creating, transporting, and installing a delivery unit.

FIG. 1 is a diagram illustrating an example embodiment 100 for creating, transporting, and installing a delivery unit. The embodiment comprises development environment 102. Development environment 102 may allow a user to create and modify objects by creating and modifying source code associated with the objects. As used herein, the term object means a unit that provides data and/or functionality that can be treated together. By way of example, and not limitation, objects may include procedures or other functionality and/or data structures of a database or other system, a unit that includes state and behavior, etc. As used herein, objects are not abstract ideas but are tangible units that may contain executable instructions to configure a system. When source code associated with an object is modified, a new version of the object may be created from the modified source code.

A plurality of objects may be organized into a delivery unit. In FIG. 1, objects 110, 114, 116, 112, and 118 collectively form a delivery unit. The delivery unit of FIG. 1 organizes objects hierarchically (e.g., objects 114 and 116 are children of 110 and object 118 is a child of 112). However, various embodiments may use hierarchical and/or non-hierarchical organization. In one representative embodiment, objects may be procedures and/or data of a database system organized into folders. Once objects are organized into a delivery unit, subsequent versions of the delivery unit may contain the same objects (or versions thereof).

In order to transport delivery units to an installation location, delivery units may be encapsulated in a transport container 104. In one embodiment, the transport container stores the delivery unit as a raw string or "blob" without further detail of the structure contained within the delivery unit. The transport container 104 is compatible with a transport mechanism or system, such as transport system 106. As illustrated in FIG. 1, transport system 106 may, but need not, represent the physical transport system (e.g., a physical carrier such as an optical disk or other physical distribution mechanism or an electronic distribution system such as a network). In FIG. 1, transport system 106 represents any mechanism to deliver the transport container to an installation location.

Once transport container 104 has been received at an installation location, the contents of the delivery unit may be extracted and installed. Database 108 represents the extraction/installation process in FIG. 1.

Figure 2:
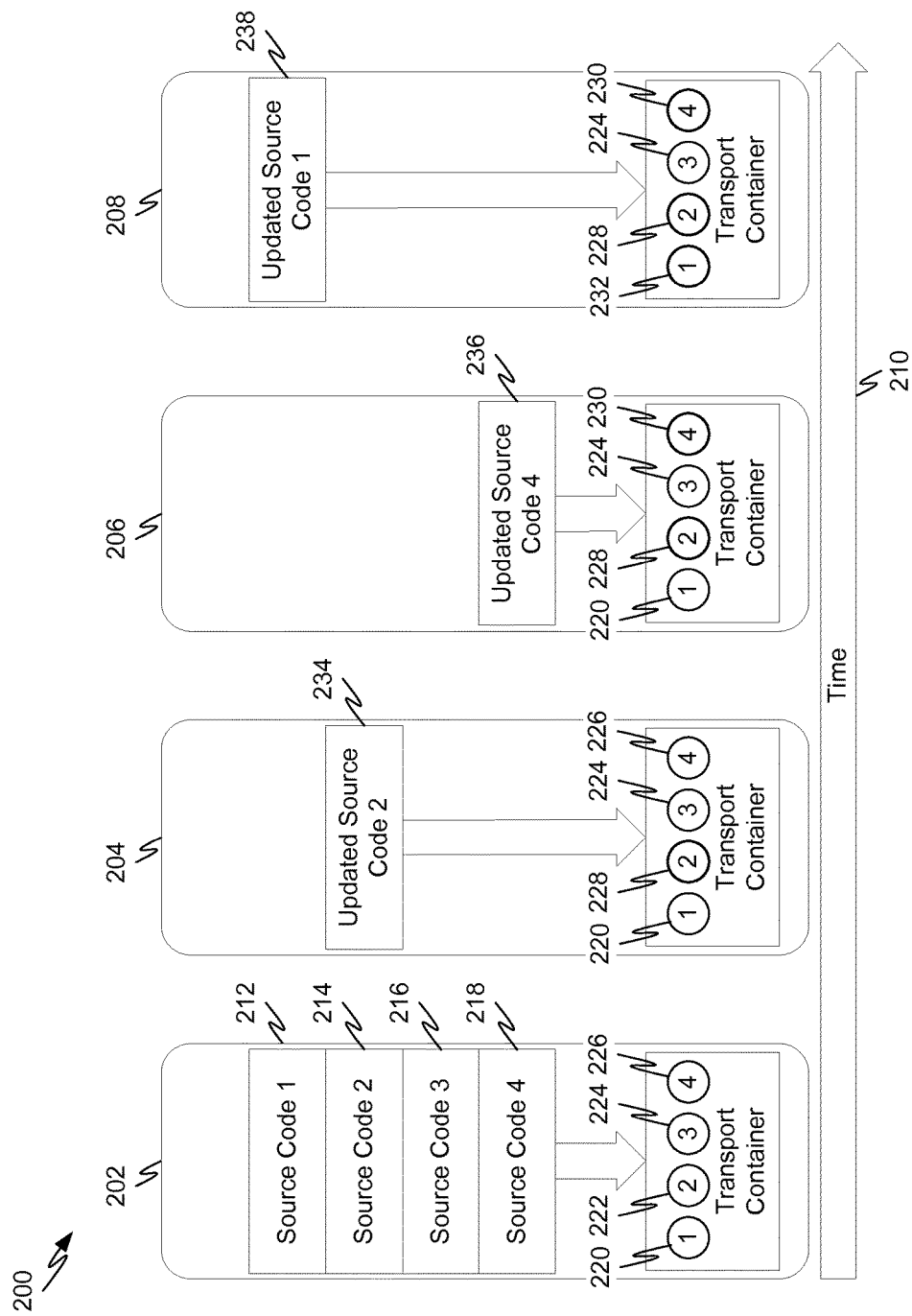
FIG. 2 is a diagram illustrating modification of objects within a delivery unit over time.

FIG. 2 is a diagram illustrating modification of objects within a delivery unit over time. The diagram, shown generally as 200, illustrates time increasing to the right as shown by arrow 210. Lane 202 represents creation of the initial delivery unit. As illustrated, the delivery unit comprises four objects, labeled 1-4 and numbered 220, 222, 224, and 226, respectively. Objects 220, 222, 224, and 226 may represent objects within a system that is used by other systems/applications. For example, database systems have business logic (line of business applications, etc.) that use functionality of the database (stored procedures, built in functions, etc.) in a multi-tier programming model. Thus, objects 220, 222, 224, and 226 may represent such stored procedures, functionality, etc. of such a database, for example. In one representative example, objects 220, 222, 224 and 226 may be objects related to the HANA database provided by SAP AG. The source code 212 represents code that would call or use functionality of object 220. The source code 214 represents code that would call or use functionality of object 222. The source code 216 represents code that would call or use functionality of object 224. The source code 218 represents code that would call or use functionality of object 226. In one representative example, code 212, 214, 216, and 218 may represent Advanced Business Application Programming (ABAP) objects. ABAP is provided by SAP AG.

As changes are made to objects 220, 222, 224, and/or 226, often corresponding changes may be made in source code 212, 214, 216 and/or 218. Thus, code and objects may be dependent upon each other. Problems can arise when new versions of objects 220, 222, 224 and/or 226 are installed without corresponding new versions of code 212, 214, 216 and/or 218 also being installed. Thus, for instances where new code versions may be installed independently, but new object versions are packaged in a delivery unit with other objects, problems and/or complications can arise if the entire delivery unit is installed as a whole. Thus, as discussed below, mechanisms can be put in place to install less than an entire delivery unit.

As shown in lane 204, at some point in time, object 220 is updated to object 228 and source code 214 is updated to code 234. As illustrated in FIG. 2, the distribution unit includes objects 220, 228, 224 and 226. Object 228 is a modified version of object 222, thus the distribution unit still contains versions of objects 1-4. Upon installation, only modified object 228 need be installed. This is illustrated in greater detail below. Installation of code 234 is not specifically discussed, but is also installed for those applications that rely on updated object 228.

Lane 206 illustrates changes to object 4. Object 226 is updated to a new version (object 230) and code 218 is updated to code 236. Object 230 is a modified version of object 226, thus again the distribution unit still contains versions of objects 1-4. Upon installation, only modified object 230 need be installed assuming independence from prior changes (e.g., object 228). Again, installation of code 236 may occur for those applications that rely on updated object 230.

Lane 208 illustrates a further change, this time to object 1. Object 232 is a modified version of object 220, thus again the distribution unit still contains versions of objects 1-4. Code 238 represents an update to code 212. Upon installation, only modified object 232 need be installed assuming independence from prior changes (e.g., objects 228 and/or 230). Installation of code 238 may occur for those applications that rely on updated object 232.

When two or more corrections (either to code or to objects) are made that affect the same transport container and at least one common object within the container, the corrections may be marked as dependent on each other. Such an indication may be made in a manner that ensures that the changes will be installed together. As described in greater detail below, the development system or a different system may track such changes so that the appropriate changes are marked as dependent.

Figure 3:
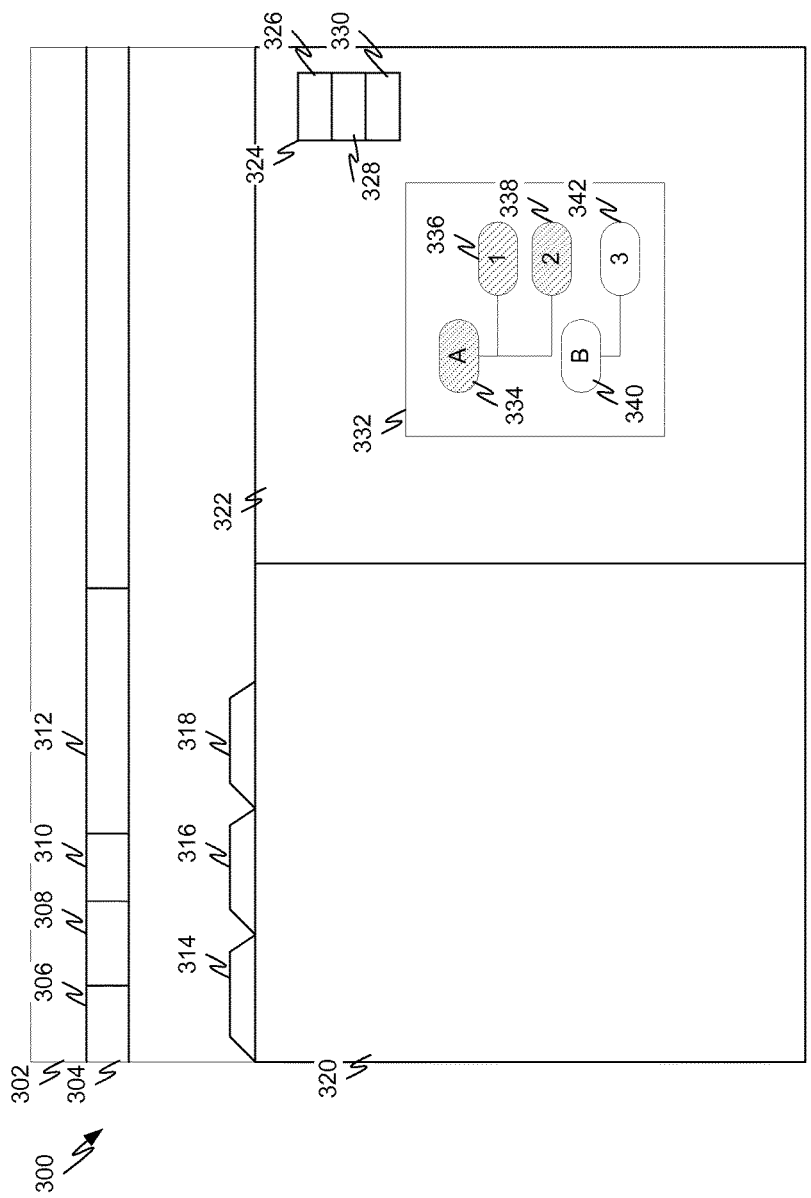
FIG. 3 is a diagram illustrating an example user interface.

FIG. 3 is a diagram illustrating an example user interface 300. This user interface 300 may be used, for example, to identify which objects are marked for installation within a distribution unit. The user interface may be presented as part of a development environment or as part of a packager that packages the distribution unit into an appropriate transport container.

User interface 300 may comprise a menu region 302. Such a menu region may contain, for example, menu items that instruct the system to perform various functions, etc. Menu items are typically represented in text, graphics, or some combination thereof. Menu items may "drop down" and/or "fly out" in order to allow selection of sub-functions and/or parameters associated with the selected functionality.

User interface 300 may also comprise a tool bar region 304 where various tools and/or menu items may be placed for quick access. In the embodiment of FIG. 3, tool bar region 304 comprises tools 308, 308, 310 and 312. Tools on the toolbar may be represented by text, graphics or some combination thereof. Some tools, such as a search tool, may have region(s) where a user can type or otherwise select or place parameters and/or other input. Although a single toolbar region is illustrated, multiple toolbars or toolbars with a mechanism to select between them may also be used.

User interface 300 may use tabs to select between multiple versions of a particular region. FIG. 3 comprises tabs 314, 316, and 318. In the particular embodiment of FIG. 3, these tabs may select between multiple versions of display regions, such as region 320 and/or region 322. In the particular embodiment of FIG. 3, region 322 displays a distribution unit 332. Distribution unit 332 may comprise a plurality of objects, such as objects 334, 336, 338, 340, and 342. While 334 and 340 are illustrated as objects, 334 and/or 340 may also represent hierarchical categories, not specific objects, in some embodiments. Thus, region 322 may display objects associated with a particular distribution unit and hierarchical organization of the objects, if any.

Region 320 may display information related to distribution unit 332 and/or object(s) associated with distribution unit 332. For example, when an object is selected, region 320 may display metadata about the selected object. As another example, when an object is selected, region 320 may display the source code associated with the object and allow editing/modification of the source code as appropriate. In yet another embodiment, both information (such as metadata) and source code may be displayed in region 320.

User interface 300 may also have floating toolbars such as toolbar 324. Toolbar 324 includes tools 326, 328 and 330. Such floating toolbars may be "docked" to various portions of the display or allowed to float free above the display regions. As various versions of the display regions are selected (such as when a new tab is selected), the toolbar may be unaffected and continue to float over the display region.

Although the representative user interface 300 of FIG. 3 illustrates a plurality of user interface elements, not all embodiments may need all the described elements. In some embodiments either fewer or more elements may be used to accomplish the purposes described below.

Figure 4:
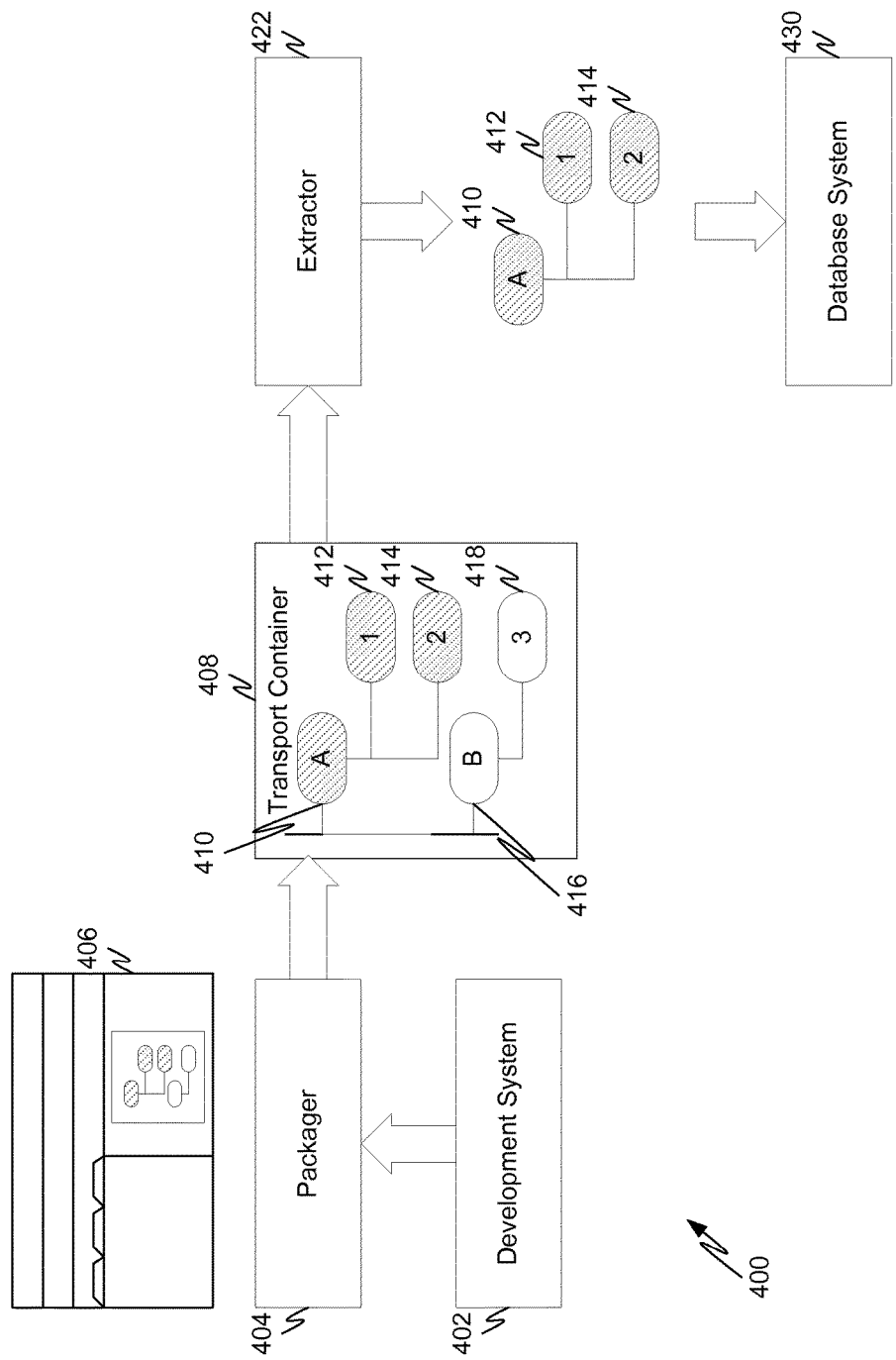
FIG. 4 is a diagram illustrating an example embodiment for creating, transporting, and installing a delivery unit.

FIG. 4 is a diagram illustrating an example embodiment 400 for creating, transporting, and installing a delivery unit. The embodiment of FIG. 4 may comprise a development environment 402. Development environment 402 may comprise various tools and/or user interface(s) to allow creation and/or modification of objects. A representative development environment is the HANA development environment (sometimes referred to as the HANA Studio) provided by SAP, AG. Such an environment may comprise various tools and/or modules such as an object navigator to navigate around the environment, an editor to edit source code, a modeler and editor to build procedures, database views, etc., as well as other modules. Along with these tools and modules may be a wide variety of built in functionality such as syntax checkers, compilers, debuggers, etc. The development environment is targeted to the ultimate system where the objects will be installed. In the embodiment of FIG. 4, that is database system 430.

Once the changes are made in development system 402, the distribution unit may be exported to a packager, such as packager 404. In one embodiment, packager 404 may part of the transport and distribution system used to distribute changes to the installation locations (e.g., database system 430). In another embodiment, packager 404 may be part of development system 402. In yet another embodiment, packager 404 may be part of a different development system, such as one that creates objects, etc. using the transport and distribution system.

Packager 404 encapsulates the distribution unit from development system 402 in an appropriate transport container. Packager 404 also allows a developer to mark the objects that should be installed as part of the installation unit. This may include presenting a user interface 406 to the developer and allowing the developer to mark the appropriate objects. Packager 406 may also include rules that help developers identify and mark appropriate dependencies, if appropriate.

User interface 406 may be the user interface of FIG. 3, or some variant thereof. Thus user interface 406 may include a region for displaying the distribution unit and for receiving selections made by a developer to mark the appropriate objects in the distribution unit for installation.

FIG. 4 illustrates the distribution unit as objects 412, 414, 418 along with a hierarchical arrangement under objects 410 and 416 as illustrated. Although 410 and 416 may be objects in some embodiments, in other embodiments 410 and 416 may simply be categories or folders into which objects 412, 414 and 418 are organized.

The unit is encapsulated into transport container 408 as indicated. In FIG. 4, objects 410, 412 and 414 have been marked for installation, as indicated by the shading accompanying these objects. Transport container 408 may then be distributed to the appropriate installation location.

When the objects within transport container 408 are to be installed, an extractor 422 may extract objects marked for installation and either install them (if the responsibility for installation lies with extractor 422) or pass the objects to an appropriate installer to allow the marked objects to be installed on database system 430. As indicated in FIG. 4, objects 410, 412 and 414 are extracted and installed on database system 430.

Figure 5:
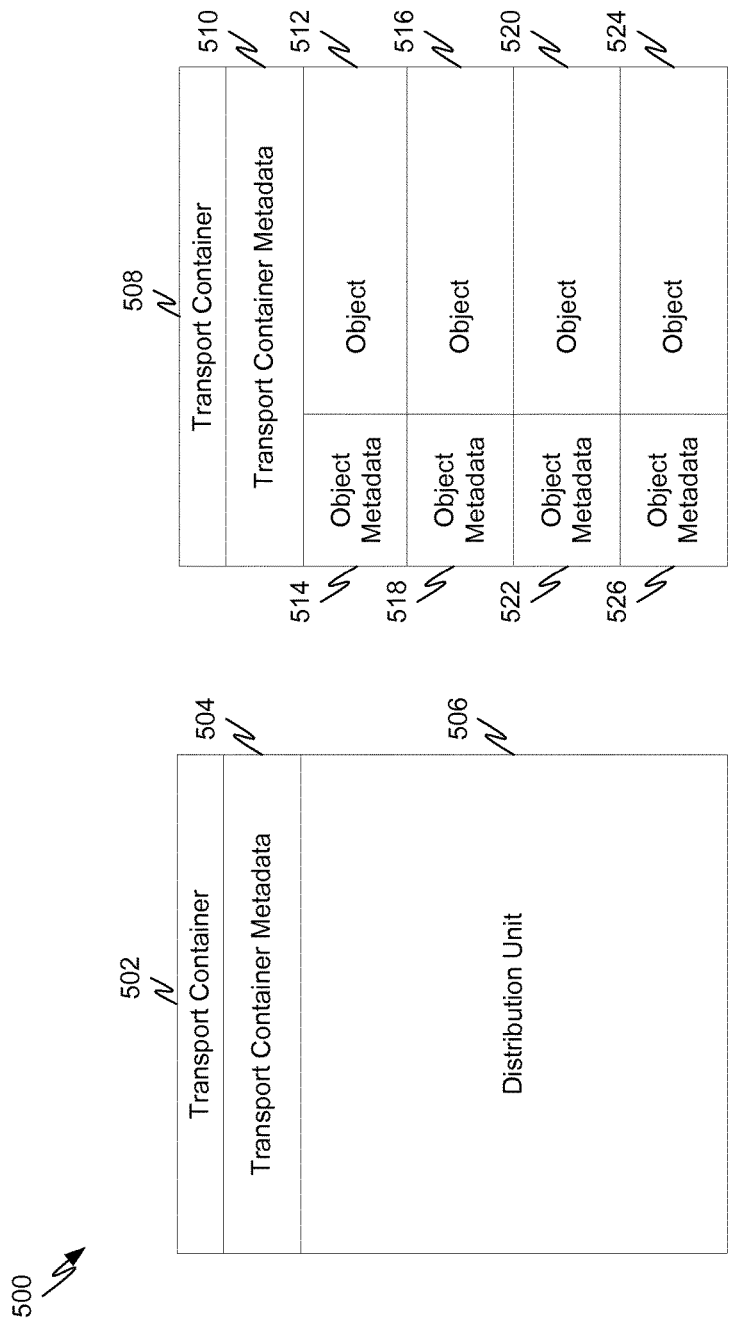
FIG. 5 is a diagram illustrating example embodiments of transport containers.

FIG. 5 is a diagram illustrating example embodiments 500 of transport containers. Transport container 502 is designed to transport a distribution unit 506 without modification to the distribution unit. Thus transport container 502 may comprise metadata 504 which may be a header or other metadata type information and distribution unit 506. Metadata 504 may contain any information necessary to proper functioning of transport container 502, including information needed by the transport and distribution system. Metadata 504 may also comprise an installation indicator for object(s) within distribution unit 506 that should be installed. In some embodiments, one installation indicator may be sufficient to identify all objects to be installed. In such an embodiment, the installation indicator may be a list, table, directory, or other structure to identify objects to be installed. In another embodiment, multiple indicator(s) may be used, with one indicator for each object to be installed. In still another embodiment, the indicator or indicators may be used to identify objects that should not be installed. Any mechanism that allows an extractor/installer to distinguish between objects to be installed and objects to not be installed may be used.

Transport container 508 is designed to transport a distribution unit but allow modification of the distribution unit to indicate which objects should be installed and which should not be installed. In this embodiment, objects 512, 516, 520 and 524 form the distribution unit. Transport container 508 may comprise metadata 510 if needed/desired to allow proper operation of transport container 508 within the transport/distribution system. Transport container 508 may also comprise metadata, located within the distribution unit, to identify objects to be installed and objects not to be installed. In FIG. 5, this is indicated as each object having associated metadata (e.g., 514, 518, 522 and 526) where appropriate information can be indicated. In other embodiments, only objects to be installed or objects not to be installed may have associated metadata. In still further embodiments, metadata may be placed at a single location within the distribution unit rather than as associated with each object. Any mechanism that allows an extractor/installer to distinguish between objects to be installed and objects to not be installed may be used, with the additional relaxed property that the information may reside within the distribution unit instead of solely outside the distribution unit.

Although not specifically illustrated, embodiments where some information resides in the transport container while other information resides in the distribution unit may also be used.

Figure 6:
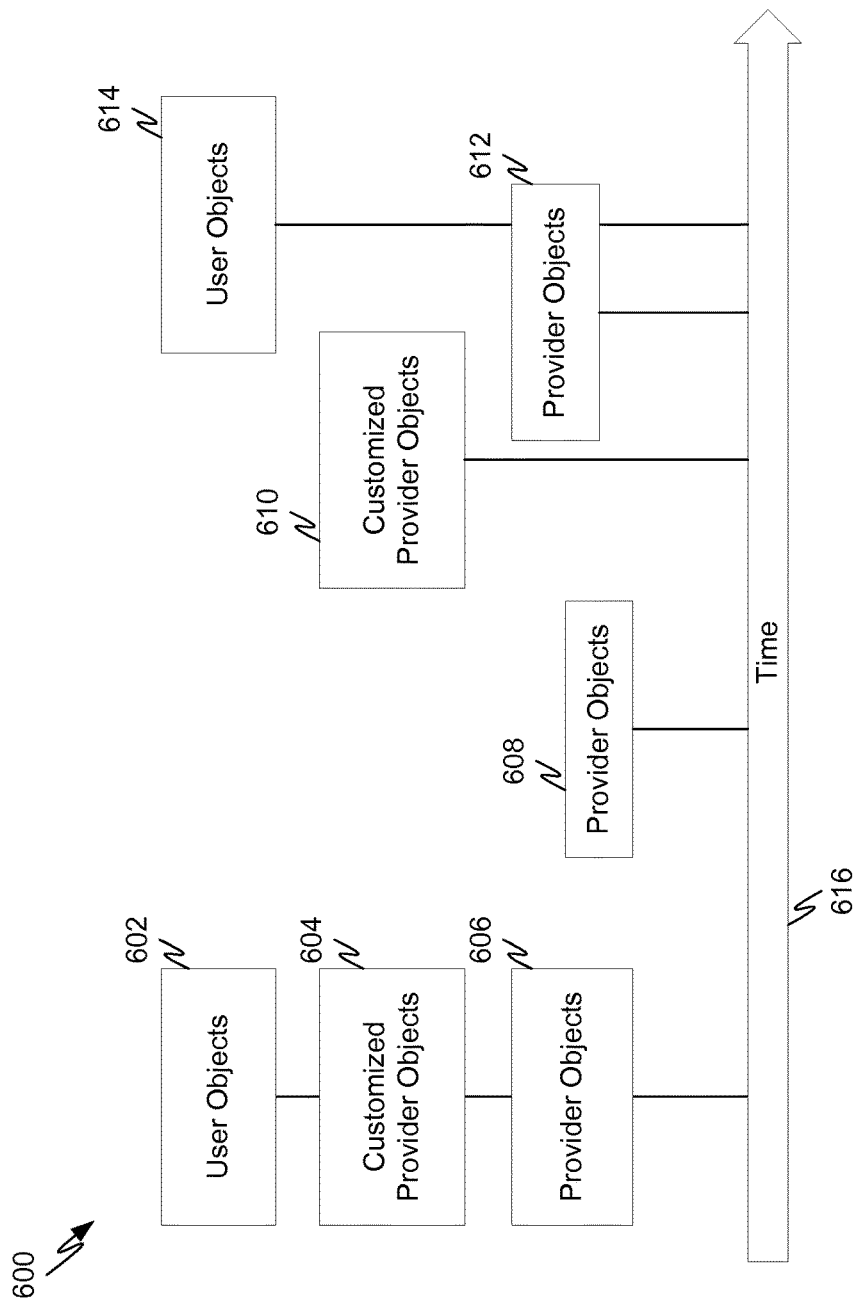
FIG. 6 is a diagram illustrating an example update schedule.

FIG. 6 is a diagram illustrating an example update schedule. This diagram illustrates, for example, how code releases may involve multiple parties. At any given time, a system such as a database may rely on code and/or objects developed and/or received from providers, custom code created in house, or some combination thereof. In the discussion of FIG. 6, the term "objects" will be used, with the understanding that underlying source code may be used to create and modify such objects. In addition, the plural of the term will be used although a single object may be updated instead.

FIG. 6 represents the example object update schedule generally as 600. Time is increasing to the right of the diagram as shown by arrow 616. At some initial point, user objects 602, customized provider objects 604 and provider objects 606 have some initial state with respect to updates and/or modifications. At some time later, provider objects 606 are updated and distributed to an installation site. FIG. 6 illustrates this by provider objects 608. Objects 608 may include a mixture of updated objects and objects still in their original versions, such as those discussed in conjunction with FIG. 2 above. When objects 608 are created, they may be encapsulated within a transport container, as discussed above, and distributed to appropriate installation location(s). Objects marked for installation may be installed as previously discussed.

Customized provider objects 610 represent an update to the customized provider objects 604. Again, some of the objects may be updated while others remain in their original state. Similarly, some of the objects to be customized may have been distributed as part of provider objects 608. Customized provider objects 610 may be modified using an appropriate development environment, such as development system 402 of FIG. 4 and/or development environment 102 of FIG. 1. As previously described, once the objects are modified, they be marked for installation as appropriate and encapsulated in an appropriate transport container. In other embodiments, the objects may be installed in a different manner, such that only the modified objects are installed.

Provider objects 612 may represent an update to provider objects 608 and/or provider objects 606. As discussed above, objects 612 may be encapsulated within a transport container, marked appropriately for installation and distributed to appropriate installation location(s). Objects marked for installation may be installed as previously discussed.

The next object release illustrated in FIG. 6 is user objects 614, which updates user objects 602. If the user does not need to transport updated objects, then there may be no need for encapsulation and appropriate marking for installation. However, such may be used as appropriate for the situation.

Figure 7:
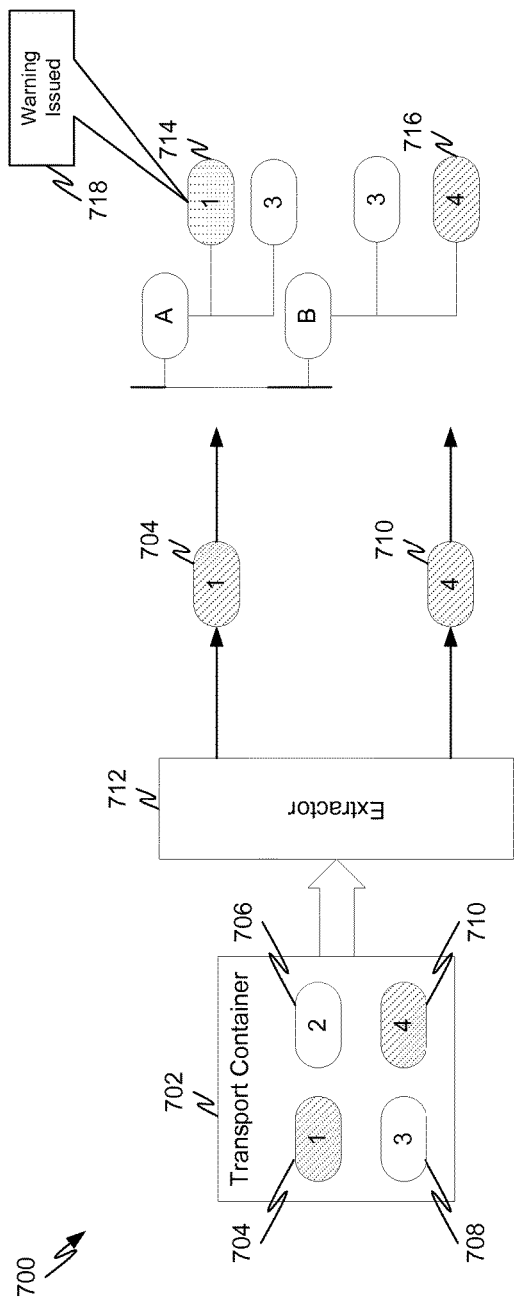
FIG. 7 is a diagram illustrating an example embodiment for installing a delivery unit.

FIG. 7 is a diagram illustrating an example embodiment 700 for installing a delivery unit. Transport container 702 contains a delivery unit. The delivery unit comprises objects 704, 706, 708, and 710 (labeled 1-4). Objects 704 and 710 have been marked for installation as indicated by the shading in FIG. 7.

When the transport container is delivered to the appropriate installation site, the objects marked for installation may be extracted from transport container 702 by extractor 712. Extractor 712 may be part of the transport and distribution system, part of an appropriate development environment, part of an installer, a separate entity, etc., depending on the embodiment.

Extractor 712 extracts objects 704 and 710 and passes them along to the installer. The installer installs them appropriately. In the embodiment of FIG. 7, object 710 is designed to update object 716 and object 704 is designed to update object 714. In this example, object 716 is a provider object that has not had further customization by the installation site. Thus, object 710 may be replace object 716 without problem.

Object 714, however, has been further customized at the installation site. Thus, users rely not only on provider functionality, but upon the customizations to such functionality. Thus, it would not be appropriate to replace object 714 with object 704 without notification to a user, system administrator, or other entity. This notification is represented in FIG. 7 by warning issued block 718. A user, system administrator, etc. may also be given choices as to how to resolve the issue, such as aborting the installation, continuing to overwrite the object, etc. In other embodiments, the system itself may decide what to do based on policies that have been established in the system. Whenever installation of a marked object would upset the configuration of the designated target system, warnings of various types may be issued, along with choices on how to proceed (in some embodiments) or subsequent actions being taken according to established policies.

Figure 8:
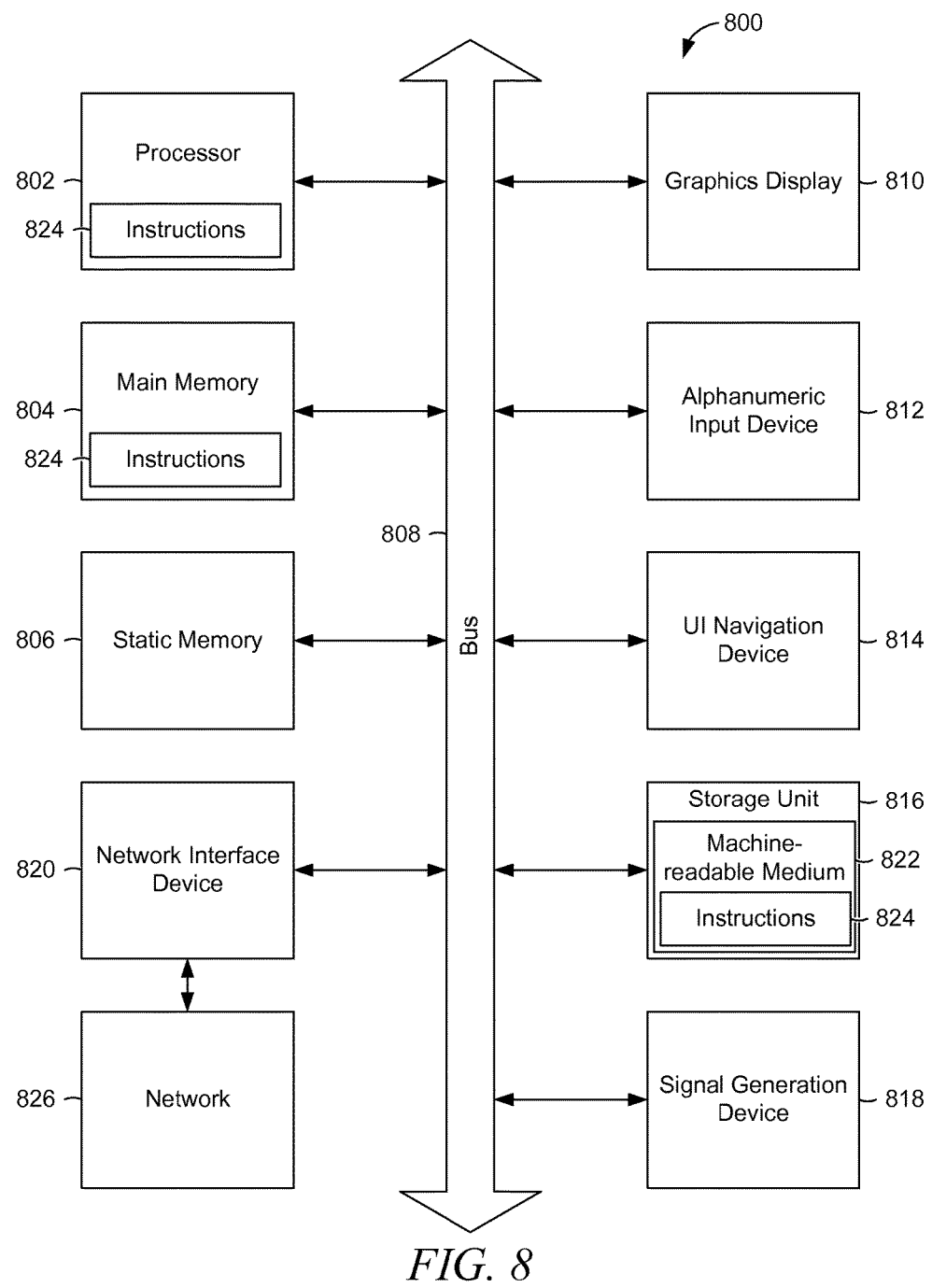
FIG. 8 is a block diagram of a computer processing system, within which a set of instructions for causing the computer to perform any one or more of the methodologies discussed herein may be executed.

FIG. 8 is a block diagram of a computer processing system, within which a set of instructions for causing the computer to perform any one or more of the methodologies discussed herein may be executed.

Embodiments may also, for example, be deployed by Software-as-a-Service (SaaS), Application Service Provider (ASP), or utility computing providers, in addition to being sold or licensed via traditional channels. The computer may be a server computer, a personal computer (PC), a tablet PC, a set-top box (STB), a personal digital assistant (PDA), cellular telephone, or any processing device capable of executing a set of instructions (sequential or otherwise) that specify actions to be taken by that device. Further, while only a single computer is illustrated, the term "computer" shall also be taken to include any collection of computers that individually or jointly execute a set (or multiple sets) of instructions to perform any one or more of the methodologies discussed herein.

The example computer processing system 800 includes processor 802 (e.g., a central processing unit (CPU), a graphics processing unit (GPU), advanced processing unit (APU) or some combination thereof), main memory 804 and static memory 806, which communicate with each other via bus 808. The processing system 800 may further include graphics display 810 (e.g., a plasma display, a liquid crystal display (LCD) or a cathode ray tube (CRT) or other display). The processing system 800 also includes alphanumeric input device 812 (e.g., a keyboard), a user interface (UI) navigation device 814 (e.g., a mouse, touch screen, or the like), a storage unit 816, a signal generation device 818 (e.g., a speaker), and a network interface device 820.

The storage unit 816 includes machine-readable medium 822 on which is stored one or more sets of data structures and instructions 824 (e.g., software) embodying or utilized by any one or more of the methodologies or functions described herein. The instructions 824 may also reside, completely or at least partially, within the main memory 804 and/or within the processor 802 during execution thereof by the processing system 800, with the main memory 804 and the processor 802 also constituting computer-readable, tangible media.

The instructions 824 may further be transmitted or received over network 826 via a network interface device 820 utilizing any one of a number of well-known transfer protocols (e.g., HTTP).

While the machine-readable medium 822 is shown in an example embodiment to be a single medium, the term "machine-readable medium" should be taken to include a single medium or multiple media (e.g., a centralized or distributed database, and/or associated caches and servers) that store the one or more sets of instructions 824. The term "machine-readable medium" shall also be taken to include any medium that is capable of storing, encoding or carrying a set of instructions for execution by the computer and that cause the computer to perform any one or more of the methodologies of the present application, or that is capable of storing, encoding or carrying data structures utilized by or associated with such a set of instructions. The term "machine-readable medium" shall accordingly be taken to include, but not be limited to, solid-state memories, and optical and magnetic media.

While various implementations and exploitations are described, it will be understood that these embodiments are illustrative and that the scope of the claims is not limited to them. In general, techniques for maintaining consistency between data structures may be implemented with facilities consistent with any hardware system or hardware systems defined herein. Many variations, modifications, additions, and improvements are possible.

Plural instances may be provided for components, operations, or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the claims. In general, structures and functionality presented as separate components in the exemplary configurations may be implemented as a combined structure or component. Similarly, structures and functionality presented as a single component may be implemented as separate components. These and other variations, modifications, additions, and improvements fall within the scope of the claims.

While the embodiments are described with reference to various implementations and exploitations, it will be understood that these embodiments are illustrative, and that the scope of claims provided below is not limited to the embodiments described herein. In general, the techniques described herein may be implemented with facilities consistent with any hardware system or hardware systems defined herein. Many variations, modifications, additions, and improvements are possible.

The term "computer readable medium" is used generally to refer to media embodied as non-transitory subject matter, such as main memory, secondary memory, removable storage, hard disks, flash memory, disk drive memory, CD-ROM and other forms of persistent memory. It should be noted that program storage devices, as may be used to describe storage devices containing executable computer code for operating various methods, shall not be construed to cover transitory subject matter, such as carrier waves or signals. "Program storage devices" and "computer-readable medium" are terms used generally to refer to media such as main memory, secondary memory, removable storage disks, hard disk drives, and other tangible storage devices or components.

Plural instances may be provided for components, operations, or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the claims. In general, structures and functionality presented as separate components in the exemplary configurations may be implemented as a combined structure or component. Similarly, structures and functionality presented as a single component may be implemented as separate components. These and other variations, modifications, additions, and improvements fall within the scope of the claims and their equivalents.

What is claimed is:

1. A method for providing object versions to a database system, the method comprising:
   obtaining a delivery unit comprising a plurality of objects, each of the plurality of objects having a prior version, at least one of the plurality of objects being modified from its prior version and the remainder of the objects being unmodified from their prior versions;
   enclosing the delivery unit in a transport container data structure;
   marking the at least one of the plurality of objects for installation such that only marked objects will be installed to the database system;
   after enclosing the delivery unit in the transport container data structure, sending the transport container data structure via a physical or electronic transport system to the database system for installation at the database system;
   receiving the transport container data structure at the database system;
   extracting the delivery unit from the transport container structure at the database system;
   extracting from the delivery unit the at least one of the plurality of objects marked for installation at the database system; and
   installing at the database system the at least one of the plurality of objects marked for installation at the database system.

2. The method of claim 1, wherein marking the at least one of the plurality of objects for installation comprises:
   creating a metadata section within the transport container data structure; and
   including, within the metadata section, information identifying the at least one of the plurality of objects for installation, such that the delivery unit within the transport container data structure remains unchanged.

3. The method of claim 1 wherein marking the at least one of the plurality of objects for installation comprises:
   creating at least one metadata section within the delivery unit; and
   including, within the at least one metadata section, information identifying the at least one of the plurality of objects for installation, such that the transport container data structure remains unchanged.

4. The method of claim 1 further comprising:
   displaying a user interface having a plurality of regions, at least one region displaying structure of the delivery unit, including displaying the plurality of objects; and
   receiving input via the user interface, the input indicating which of the plurality of objects should be marked for installation.

5. The method of claim 1, wherein the at least one of the plurality of objects comprises at least two objects and wherein the method further comprising marking the at least two objects as dependent on each other.

6. The method of claim 1 wherein the delivery unit is obtained from a development environment used to modify prior versions of the plurality of objects.

7. The method of claim 1, further comprising:
   discarding any unmarked objects.

8. The method of claim 1, wherein the delivery unit has a prior version comprising the prior version of the plurality of objects.

9. A system for providing object versions to a database system, the system comprising:
   memory;
   a computer processor coupled to the memory;
   instructions stored in the memory and executable by the computer processor, the instructions comprising a packager configured to:
      obtain a delivery unit comprising a plurality of objects, the plurality of objects comprising at least one modified object and at least one unmodified object;
      enclose the delivery unit in a transport container data structure;
      mark the at least one modified object for installation such that only marked objects will be installed to the database system;
      after enclosing the delivery unit in the transport container data structure, send the transport container data structure to the database system via a physical or electronic transport system
      receive the transport container data structure at the database system;
      extract the delivery unit from the transport container structure at the database system:
      extract from the delivery unit the at least one of the plurality of objects marked for installation at the database system; and
      install at the database system the at least one of the plurality of objects marked for installation at the database system.

10. The system of claim 9, wherein the instructions further comprise a development environment configured to:
    display source code used to create a prior version of the at least one modified object,
    receive input modifying the source code;
    create the at least one modified object from the modified source code; and
    create the delivery unit.

11. The system of claim 9, wherein the packager is part of a development environment configured to:
    display source code used to create a prior version of the at least one modified object;
    receive input modifying the source code;
    create the at least one modified object from the modified source code; and
    create the delivery unit.

12. The system of claim 9, wherein the objects are used in a database system.

13. The system of claim 11, wherein the development environment is a development environment for a database system.

14. The system of claim 13, wherein the packager is separate from the development environment.

15. A machine-readable storage medium for storing data for access by a database system, comprising:

a transport container data structure configured to transport a raw data stream;

a delivery unit comprising a plurality of objects, the plurality of objects comprising a modified data object and an unmodified data object, the delivery unit stored as the raw data stream within the transport container data structure, wherein at least one of the plurality of objects is marked for installation at a database system;

metadata comprising an installation indicator, the installation indicator to indicate that the modified data object is to be installed at the database system;

instructions executable by a computer processor at the database system to cause the database system to perform operations comprising:

extracting the delivery unit from the transport container structure at the database system;

extracting from the delivery unit the at least one of the plurality of objects marked for installation at the database system; and installing at the database system the at least one of the plurality of objects marked for installation at the database system.

16. The machine-readable storage medium of claim 15, wherein the plurality of objects comprises a second modified object and wherein the metadata comprises a dependent indicator to indicate that the modified object and the second modified object are dependent on installation of the other.

17. The machine-readable storage medium of claim 15, wherein the plurality of objects of the delivery unit are arranged in a hierarchical manner.

18. The machine-readable storage medium of claim 15, wherein the plurality of objects are procedures organized into folders.

19. The machine-readable storage medium of claim 15, wherein the plurality of objects are procedures of a database system.

20. The machine-readable storage medium of claim 15, wherein the metadata is stored as part of the transport container data structure such that the delivery unit remains unchanged by the metadata.

\* \* \* \* \*